(12) United States Patent
Lundkvist et al.

(10) Patent No.: US 9,239,932 B2
(45) Date of Patent: Jan. 19, 2016

(54) SECURE HANDLING OF USER RELATED INFORMATION BETWEEN WEB APPLICATIONS

(75) Inventors: Karl-Johan Lundkvist, Solna (SE); Per-Erik Brodin, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/984,732

(22) PCT Filed: Feb. 18, 2011

(86) PCT No.: PCT/SE2011/050185
§ 371 (c)(1),
(2), (4) Date: Aug. 9, 2013

(87) PCT Pub. No.: WO2012/112096
PCT Pub. Date: Aug. 23, 2012

(65) Prior Publication Data
US 2013/0318627 A1    Nov. 28, 2013

(51) Int. Cl.
*G06F 21/00*  (2013.01)
*H04L 29/06*  (2006.01)
*G06F 21/62*  (2013.01)
*G06F 21/44*  (2013.01)
*H04L 29/08*  (2006.01)

(52) U.S. Cl.
CPC ............ *G06F 21/62* (2013.01); *G06F 21/445* (2013.01); *H04L 63/126* (2013.01); *H04L 63/1483* (2013.01); *H04L 67/02* (2013.01)

(58) Field of Classification Search
CPC ....... H04L 63/10; H04L 63/12; H04L 63/126; G06F 21/62

USPC .......................................................... 726/27
See application file for complete search history.

(56) References Cited

U.S. PATENT DOCUMENTS

| 6,694,434 B1 * | 2/2004 | McGee et al. ................ 713/189 |
| 7,424,608 B1 * | 9/2008 | Cherukumudi et al. ...... 713/156 |
| 8,255,280 B1 * | 8/2012 | Kay et al. ..................... 705/26.1 |

(Continued)

OTHER PUBLICATIONS

Unknown, Author. "Cross Origin Resource Sharing." Editor's Draft Jun. 11, 2012. Editor Anne van Kesteren. Copyright W3C 2012. Available online at <https://dvcs.w3.org/hg/cors/raw-file/tip/Overview.html>.

(Continued)

*Primary Examiner* — Hadi Armouche
*Assistant Examiner* — Bryan Wright
(74) *Attorney, Agent, or Firm* — Patent Portfolio Builders, PLLC (57) ABSTRACT

Methods and arrangements in a client node and a server node for supporting secure handling of information related to a user, said information being stored by the server node and comprising certain data. The user is assumed to be authenticated towards the server node and to employ a first and a second web application in a web browser supporting cross-Origin resource sharing. The methods and arrangements involve determining whether the first web application is permitted to access the certain data owned by the second web application, and allowing or denying the first web application to access the certain data, based on whether the first web application is permitted to access the data. The methods and arrangements further involve providing user input related to a permission for accessing the certain data, to the server node, and establishing and declaring a mutual trust relation between the first and the second web application.

9 Claims, 9 Drawing Sheets

(56) References Cited

U.S. PATENT DOCUMENTS

| | | | |
|---|---|---|---|
| 2007/0118639 A1* | 5/2007 | Bellifemine et al. | 709/224 |
| 2008/0014912 A1* | 1/2008 | Otaka et al. | 455/418 |
| 2008/0282319 A1* | 11/2008 | Fontijn et al. | 726/1 |
| 2009/0063613 A1* | 3/2009 | Chijiiwa | G06Q 10/10 709/202 |
| 2010/0281107 A1* | 11/2010 | Fallows | G06F 9/54 709/203 |
| 2010/0281537 A1* | 11/2010 | Wang et al. | 726/22 |
| 2011/0246772 A1 | 10/2011 | O'Connor et al. | |

OTHER PUBLICATIONS

Barth, A. "The Web Origin Concept." Internet Engineering Task Force (IETF). ISSN: 2070-1721. Dec. 2011. Available online at <http://tools/ietf.org/html/rfc6454>.

Shahriar, H. et al. "Client-Side Detection of Cross-Site Request Forgery Attacks." 2010 IEEE 21st International Symposium on Software Reliability Engineering. Nov. 1-4, 2010, pp. 358-367, San Jose, CA, USA.

* cited by examiner

SECURE HANDLING OF USER RELATED INFORMATION BETWEEN WEB APPLICATIONS

TECHNICAL FIELD

The invention relates generally to methods and arrangement for supporting secure handling of information related to a user.

BACKGROUND

All web applications for web browsers are associated with an "Origin". The Origin of a web application is the server or domain from which the web application originates. The "Origin concept" is well established and described in the context of web browsers and web applications. Formerly, a "Same Origin" policy was applied for web browsers, which implied that a web application employed in a web browser could only request and retrieve data from the Origin from which the web application was loaded. The Same Origin policy was applied in order to prevent "malicious" applications from retrieving non-public information via a client, e.g. from the intra-network of a company, as illustrated in FIG. 1.

Figure 1:
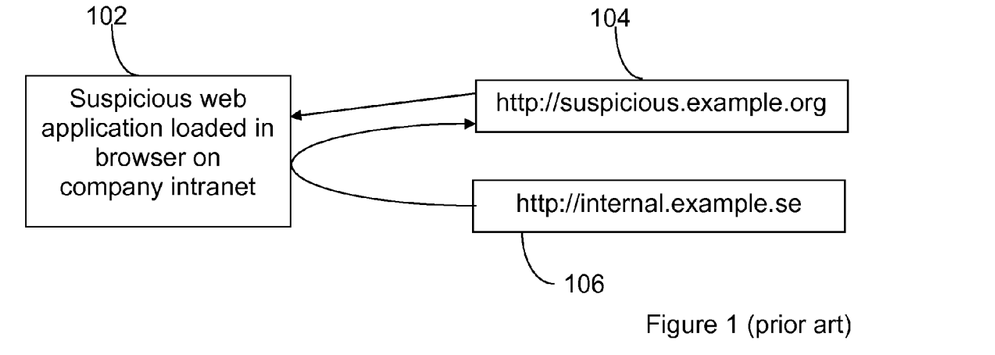
FIGS. 1-3 are schematic views illustrating data access, according to the prior art

FIG. 1 illustrates a scenario according to the prior art were the Same Origin policy is not applied. A suspicious web application 104 is loaded in a browser on a company intranet by an unsuspecting user. When being loaded in the browser, the suspicious web application 104 may access and "steal" information from the company's intranet 106 without the user's knowledge.

For example, applying the Same Origin policy prevents malicious or fraudulent web pages or applications from obtaining personal user data from a user being logged in to a popular social networking site, such as e.g. "Facebook", in the same browser, given that the malicious or fraudulent web pages have other Origins than the social networking site. However, the Same Origin policy is not compatible with the desire of many application developers to create web applications which collect and use data from one or more Origins, other than the Origin from which the web application was loaded.

In order to enable web applications to make requests, using XMIHttpRequest or similar, to other Origins than the Origin from which it was loaded, a mechanism to enable client-side cross-Origin requests has recently been defined in the W3C proposed standard document "Cross-Origin Resource Sharing" (CORS) [1].

Figure 2:
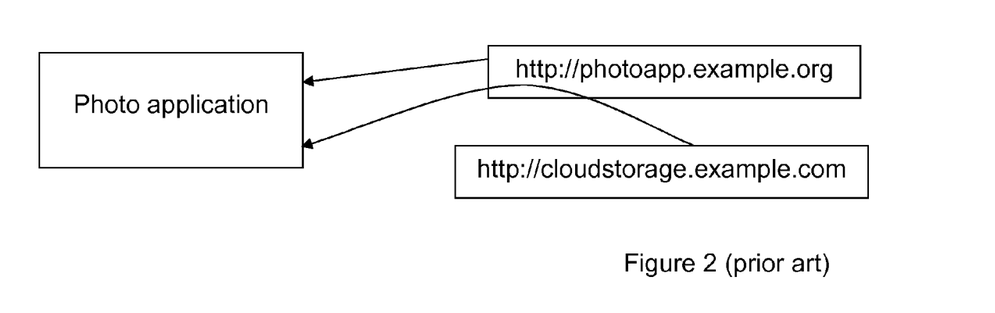
Figure 3:
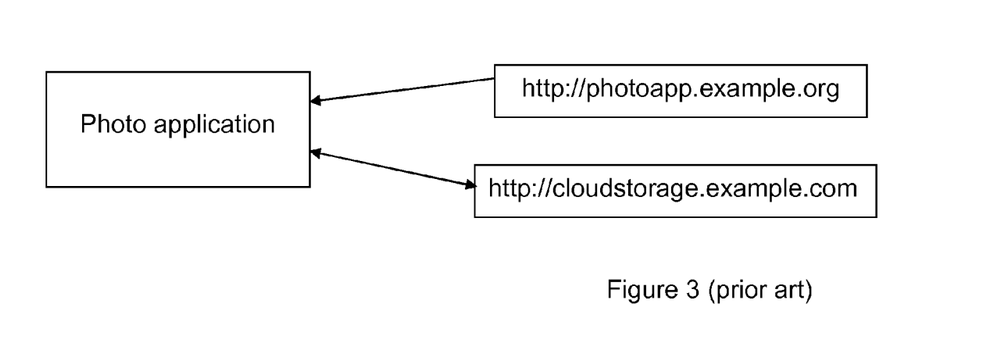

The use of CORS or similar mechanisms enables e.g. client side "mash-ups" and the creation of applications that rely on a content server or Origin, which is distinct from the Origin of the application, e.g. to store its data. A "mash-up" is a web page or application that uses and combines e.g. data, presentation or functionality from two or more sources to create new service. When web applications are able to communicate directly with another Origin, as illustrated e.g. in FIG. 3, users who apply said web applications in a browser can also authenticate directly with those servers without the need for server-to-server authentication schemes such as OAuth (Open Authorization). One advantage of CORS is that a single provider, e.g. a content server, can act backend for a number of third-party applications, without them having to proxy the traffic thru their own Origins or servers. Such a proxy scenario is illustrated in FIG. 2.

Figure 4:
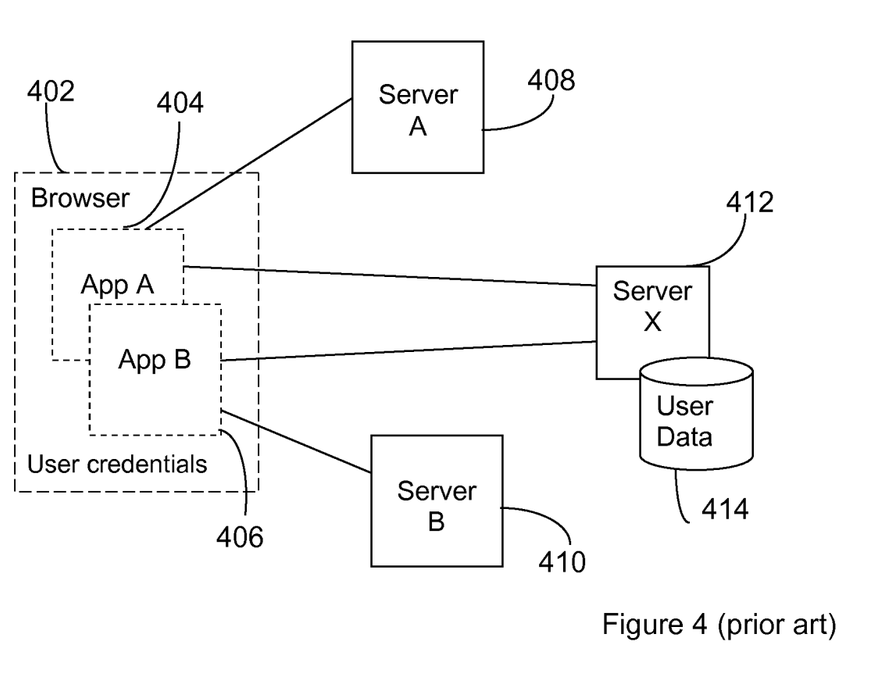
FIG. 4 is a schematic view illustrating a scenario where CORS is applied, according to the prior art.

However, when using CORS or similar, a potential problem could arise when two different applications (A 404 and B 406) from two Origins, 408 and 410, respectively, store and fetch their data in/from the same content server (X 412), to which a user of A and B is authenticated. This situation is illustrated in FIG. 4. The user is authenticated directly towards the content sewer X, which typically means that any request to X carrying the authentication token (typically a cookie) is valid. Consequently, a user which authenticates towards X when entering X via A, would already be "logged in", i.e. authorized, if she or he later navigated to B, when using the same web browser 402. This may imply that application B can access any user-related data 414 stored on X without the need for the user's authorization. For example, B would be able to access data belonging to application A.

For example, when a user, which is logged in to a Popular Social Networking Site (PSNS), navigates to a popular news site, e.g. "CNN", the user may there get to see which of her or his PSNS "friends" that are currently browsing CNN. This is possible, since the PSNS credentials are stored in the browser, and may thus be included when the browser makes a request towards another Origin on behalf of CNN. Thus, the news site CNN may get access e.g. to a record of the PSNS "friends" of the user, without the user having authorized such an access. CNN may then map the record of PSNS "friends" against all other PSNS-authenticated users visiting the news site, and thus display which of the user's "friends" that are currently browsing CNN. In this case, the news site would have registered with the PSNS, in order to be allowed to fetch information using COBB. However, such a registration can easily be made for any application, also for fraudulent applications.

It may be desired that two applications A and B share user data with each other, but, it may just as well be undesired that A and B share data, by e.g. a provider of at least one of the applications and/or by the user. Therefore, the above described possibility for e.g. fraudulent applications to make authorized requests is identified as a security risk.

SUMMARY

It would be desirable to enable secure handling of user-related information stored in a server node which is used by multiple web applications of different origins in situations where cross-Origin resource (information/data) sharing is supported. It is an object of the invention to enable secure handling of user-related information managed or stored by a server node which is used by multiple web applications of different origins employed by a user in a browser supporting cross-Origin resource (information/data) sharing. Further, it is an object of the invention to provide methods and arrangement for enabling secure handling of user-related information managed or stored by a server node. These objects and others may be met by methods and arrangement according to the attached independent claims. Optional embodiments are defined by the dependent claims.

According to a first aspect, a method is provided in a sever node. The method comprises determining the Origin of a first web application, from which a request for data access has been received. The method further comprises determining the Origin of the (second) web application owning the data for which access has been requested. The method further involves determining whether the first web application is permitted to access the requested certain data, when the Origins of the first and the second web applications are different; and allowing or denying the first web application to access the certain data, based on whether the first web application is permitted to access the data.

According to a second aspect, an arrangement is provided in a server node. The arrangement comprises a functional unit which is adapted to receive a request, for access to certain data stored by the server node, from a first web application. The arrangement further comprises a functional unit which is adapted to determine the Origin of the first web application, and further is adapted to determine the Origin of a second web application owning the certain data. The functional unit is further adapted to determine, when the Origin of the first web application is different from the Origin of the second web application, whether the first web application is permitted to access the certain data. The arrangement further comprises a functional unit, which is adapted to allow or deny the first web application to access the certain data, based on whether the first web application is permitted to access the data.

According to a third aspect, a method is provided in a web browser in a client node. The method comprises receiving a prompt from a server node, said prompt comprising a request for user input and being related to a permission for a first web application to access certain data owned by a second web application. The method further comprises displaying information comprised in the prompt receiving user input as an answer to the request, and providing said user input to the server node.

According to a fourth aspect, a web browser is provided in a client node. The web browser comprises a functional unit adapted to receive a prompt from a server node, the prompt being comprising a request for user input and information related to a permission for a first web application to access data on the server node which data is owned by a second web application. The web browser further comprises a functional unit adapted to display information comprised in the prompt and a functional unit adapted to receive user input related to the prompt. Further, the web browser comprises a functional unit adapted to provide said user input to the server node.

According to a fifth aspect, a method is provided in a server node. The method comprises receiving a request from a developer of a first web application to establish a trust relation between the first web application and a second web application. The method further comprises providing said request to a developer of the second web application, and receiving an answer from the developer of the second web application. The method further comprises declaring a mutual relation between the first and the second web application in accordance with the received answer.

According to a sixth aspect, an arrangement is provided in a server node. The arrangement comprises a functional unit adapted to receive a request from a developer of a first web application to establish a trust relation between the first web application and a second web application. The arrangement further comprises a functional unit adapted to provide said request to a developer of the second web application. A functional unit is further adapted to receive an answer from the developer of the second web application. Further, the arrangement comprises a functional unit adapted to declare a mutual relation between the first and the second web application in accordance with the received answer.

The above methods and arrangement enable that many web applications can share the same content server for e.g. storing and retrieving user private data using cross-origin requests and securely share that data in between applications.

The above methods and arrangement may be implemented in different embodiments. In some embodiments the first web application is determined to have permission to access the certain data when a mutual trust relation between the first and second web applications have been declared. In some embodiments the first web application is determined to have permission to access the certain data when a user has authorized the access by answering a prompt. A user may be prompted e.g. as a complement when the first and second web application are declared to have a mutual trust relation, or, when the first and second web application are not associated with any declaration related to a mutual trust relation. A permission or trust relation may be valid for a certain set or subset of data, e.g. data stored in a certain folder or entity.

Further, in some embodiments, the declaring of a mutual relation between a first and a second web application may involve storing an indicator of the mutual relation in association with the first and second web application.

The embodiments above have mainly been described in terms of a method. However, the description above is also intended to embrace embodiments of the arrangements, adapted to enable the performance of the above described features. The different features of the exemplary embodiments above may be combined in different ways according to need, requirements or preference.

BRIEF DESCRIPTION OF THE DRAWINGS

The invention will now be described in more detail by means of exemplary embodiments and with reference to the accompanying drawings, in which.

DETAILED DESCRIPTION

When a user authenticates with a server X from a browser, credentials are associated with that server's Origin and stored in the browser. As previously described, when using CORS or similar mechanisms, any request from a web application employed by the user in the same browser, regardless of Origin, can include the credentials, and thus any applications run by the user could have the same permissions as was previously granted to another application having a certain Origin.

By use of the "Origin header", as defined in section 6 in [2], the content server X will be able to distinguish between requests originating from the previously mentioned exemplifying respective applications A and B, since they have distinct Origins. Thus, if X associates stored data with the Origin of the application that has stored the data, web applications could be prevented from accessing data belonging to another application or Origin likewise, requests originating from applications with an Origin that is unknown to X could be rejected, e.g. to prevent so-called Cross-Site Request forgery (XSRF), i.e. malicious exploit of a website whereby unauthorized commands are transmitted from a user that the website trusts.

However, a solution needs to be found also for the case when it is desired that two applications, A and B, share user-related data, which is stored by the same content server (X), in a controlled and secure way.

Although it may seem straightforward to use the Origin header to limit the data access of an application to its own user data; but if it is desired that applications share user data amongst them in a secure way, a more sophisticated approach is needed. Within this document a solution which addresses this need is described. The solution may be implemented in different embodiment, which could be used either separately or combined.

The exemplifying web applications A (of Origin A) and B (of Origin B) will be used throughout this document to illustrate different embodiments. The application A is assumed to have an owner or application developer, which will be denoted DA. The application B is assumed to have an owner or application developer, which will be denoted DB.

According to one exemplifying embodiment, an application-to-application, or "app-to-app", "friend" request scheme is used, which allows the owner, DB, of application B and other applications of Origin B, to request access to application A's, and other applications of Origin A's, user data, by issuing a request to application A's owner, DA. It is assumed that the owner or application developer of a web application is able to judge whether it would be safe to grant access to data owned by the application to a web application of another Origin. It is further assumed that the developer of a web application has the end-users' best interest in mind when making such a decision concerning data-sharing. The system for handling the "app-to-app friend requests" and managing the permissions is one aspect of the solution, and will also be described herein.

According to another embodiment, a user of an application B is required, in addition to being logged in to a content server X, to grant application B access to user related data that belongs to other applications, not having the same Origin as application B, e.g. application A of Origin A, which is also employed by the user. Thus, even when being logged in to the content server X e.g. via application A, the user will, when entering X via application B, still have to confirm or authorize application B's usage of data belonging to application A, or rather Origin A, on content server X. The application (B) declares up-front which data it wants to use (e.g. app A's data) when it request the login dialog. The user interaction is similar to that of OAuth in the sense that the user is prompted for what permissions the application is asking for.

The embodiments described above may be used in combination. For example, when an app-to-app friend request has been granted between two web applications for a content server X, the user may still be prompted to acknowledge each use of "cross Origin" application data between "friend applications" on the content server X.

For an application to be able to use a certain content server, e.g. for storing user data, the application must be registered at said content server. A content server typically has a management console where developers of web applications aiming to use the content server can administer settings associated with their respective application's use of the server. According to an exemplifying embodiment the following functionality is provided in such a server management console:

When the owner, DB, of application B want to incorporate data belonging to another application of another Origin, e.g. application A of Origin A, that is using the same server, she/he will find application A in a list of registered applications in the server management console. By selecting the other application, A, and indicating, e.g. by hitting a "Friend request button", that she/he wants application B to "befriend" application A on the server, a request for application friendship is sent to the developer, DA, of the other application, A, e.g. as a message in the management console and/or as an email or similar.

Should developer DA choose to accept the request, applications B and A will have access to each other's data on the server. Application developer DB may then add the necessary logic to application B to make use of application A's data. The content server can keep track of which applications that are allowed to access which data, by storing a list of granted Origins associated with each application's data. Further, permissions could be more granular, meaning that permissions could be granted for a subset of an application's data only. Application "friendship" could be revoked at any time, by either of the involved parties, from the management console, e.g. by selecting the application in question and press a "De-friend button".

When a user is to be trusted to make decisions regarding access to cross-origin data for different applications, it may be arranged such that the user will appear as not being "fully logged in" on a server X when visiting a new application, e.g. B, which uses X, even though the user has already authenticated towards X via another application, e.g. A. The user would then need to authenticate each and every application which is to interact with X, since permissions to access data on the content server X then would need to be approved by the user. Although the user's browser has a cookie stored that authenticates the user with the content server X, the use of e.g. a flag preventing access to application data on the content server X can require application B to bring up an authentication dialog, which is served directly from X. The call to bring up the authentication dialog may include a declaration of what permissions that application B requests. The first time in a session that a user uses an application that accesses the content server X, the user is not authenticated to X and needs to provide the user credentials. Once authenticated, each visit to another application that uses X will thus not require any user credentials but the user only needs to confirm the permissions as requested by the respective application.

Figure 5:
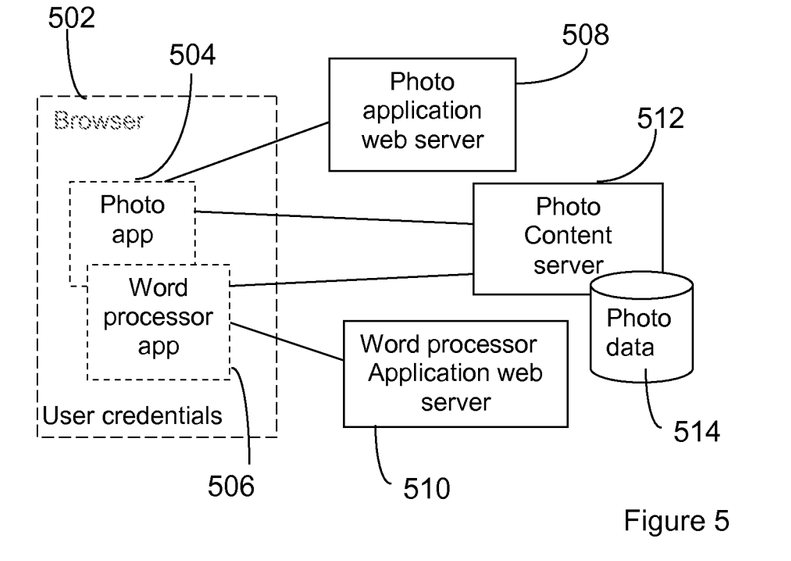
FIG. 5 is a schematic view illustrating a scenario where exemplifying embodiments may be applied.

Below, a fictive scenario illustrating an exemplifying embodiment will be described with reference to FIG. 5. FIG. 5 shows a web browser 502 into which two web applications are loaded: one Photo application 504 (WebPhotoApp) and one Word processor application 506 (WordProcApp). The Origin of WebPhotoApp is the Photo application web server 508 (OP). The Origin of WordProcApp is the Word processor application web server 510 (OW)

A user, "Sally", is using the photo application WebPhotoApp in the browser to manage her photos. Her photos 514 are stored on a Photo Content Server 512 (PCS) in the cloud, and can be accessed securely via the web based application WebPhotoApp. The application WebPhotoApp allows her to manage the photos and albums as well as to apply some filters to the photos.

When Sally has been on vacation, she wants to write down her memories in a digital journal, and decides to use the web based word processor application WordProcApp, which many people have recommended.

As Sally is logged in with the photo application WebPhotoApp, watching photos of her recent vacation, she comes up with the brilliant idea to add some of the pictures to her vacation journal. She opens a new browser tab and navigates to the word processor application WordProcApp, where she clicks "import picture from application WebPhotoApp". Then, she is prompted with a window saying "Hello Sally! Do you allow WordProcApp to access your pictures from WebPhotoApp? WebPhotoApp trusts WordProcApp." Sally feels relieved to see that her photo application thinks the word processor application is secure, so she clicks "OK", and her vacation pictures appear in the word processor application.

Figure 6:
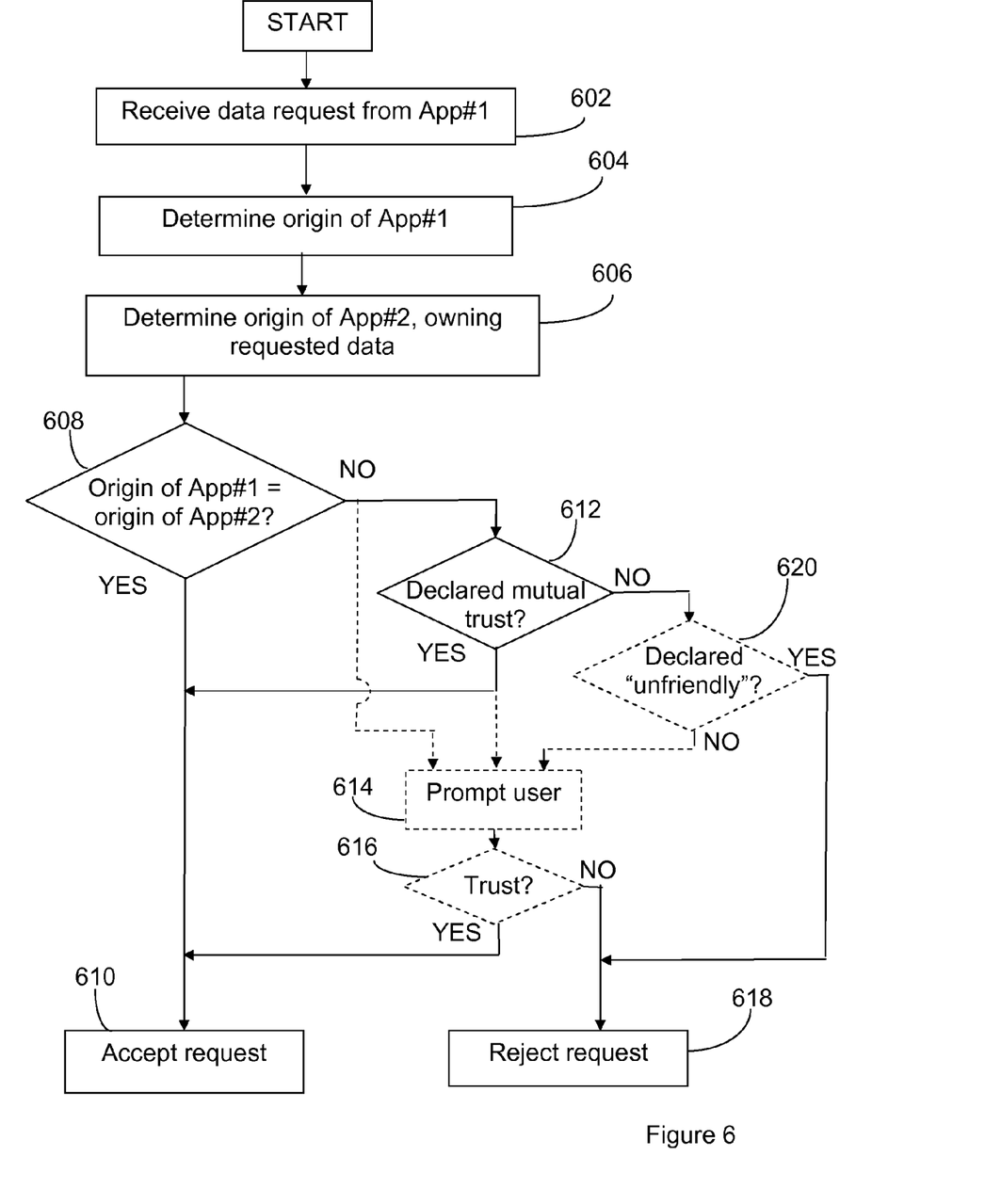
FIG. 6 a flow chart illustrating a procedure in a server node for supporting secure resource sharing, according to an exemplifying embodiment.

Exemplifying Procedure, FIG. 6

An embodiment of a procedure in a server node for supporting secure handling of information related to a user which is authenticated towards the server node will now be described with reference to FIG. 6. The information is assumed to be stored by the server node and to comprise certain data related to the user. The user is assumed to employ a first and a second web application in a web browser supporting CORS or similar. The server node is a web server.

Initially, a request for access to certain data is received from the first web application in an action 602. Then, the Origin of the first web application is determined in an action 604. The Origin of the first web application may be determined from the Origin header of the request message. Further, the Origin of the application owning the requested certain data is determined in an action 606, e.g. by inspecting the certain data or information stored in association with said data. Here it is assumed that the application owning the requested certain data is the second web application employed by the user. Then, it is determined whether the first application and the application owning the certain data have the same origin, in an action 608. If the web applications have the same origin, or indeed is the same application, the request for data access from the first web application is accepted, in an action 610, since web applications having the same Origin have a mutual trust relation per definition.

However, when the Origin of the first application differs from the Origin of the second web application, it should be determined whether the first web application is permitted to access the certain data. This could be determined in different ways, which will be described below.

One possibility is to determine whether a mutual trust relation has been declared between the first and the second web application. Such a mutual trust relation may be established by an agreement between the owners/developers of the web applications, e.g. via the management console of the server node, and the trust relation may be declared e.g. by the storage of an indication of the mutual trust relation between the two web applications, or Origins, in the server node. A trust relation between two web applications also implies a trust relation between the Origins of the two web applications.

If such a trust relation between the first and second web applications has been declared, the request for data access may be accepted. If no such trust relation has been declared, the request may be rejected in an action 618. Alternatively, or in addition, the user could be prompted, in an action 614, to answer whether the first application should be allowed or denied access to the certain data belonging to the second application. If such prompting is used, the request for data access is accepted or rejected in accordance with the user's answer 616 to the prompt. If the user fails to answer the prompt, e.g. within a certain time, this could be interpreted as a negative answer, i.e. that the data access request should be rejected.

Further, when no relation of mutual trust has been declared, it may be determined in an action 620 if the two web applications i) have been declared "non-friends" or "enemies", i.e. declared not to have a mutual trust relation, or to have an "unfriendly" relation, or, if e.g. no attempts to establish a trust relation have been made from either developer. The applications could be declared to be "non-friends" e.g. when the developer of one of the applications has rejected a "mutual trust request" from the developer of the other application, or refrained or neglected to answer such a request. When the first and second web applications have been declared to be "non-friends", the request for data access may be rejected 618. When the web applications are not declared to be "non-friends", the user could be prompted 614, if the user is trusted to make such a decision. The user could be prompted also when the web applications are declared "non-friends" (not illustrated). However, it would be appropriate to include information on the standpoint of the developer(s) in such a prompt. The standpoint of the developer(s) could be included in a prompt also when a mutual trust relation between the applications is declared.

Further, the first and second web applications may have a mutual trust relation that is valid only for a part or subset of the user related information or data stored by the server node. For example, the mutual trust relation may be valid for data stored in a certain shared folder or entity. Thus, when the first web application is determined to have permission to access only a subset of the certain data, the first web application is allowed access to said subset of the certain data (e.g. data stored in said shared folder or entity), but is denied access to the remaining certain data (e.g. data stored in other folders or entities than said shared folder).

The actions 612-616 and 620 may be regarded as component which may be used in different combinations for determining whether the first application is permitted to access the certain data owned by the second application. Some of these actions are illustrated with a dashed outline, and connected by dashed arrows, to illustrate that different alternatives are possible.

Figure 7:
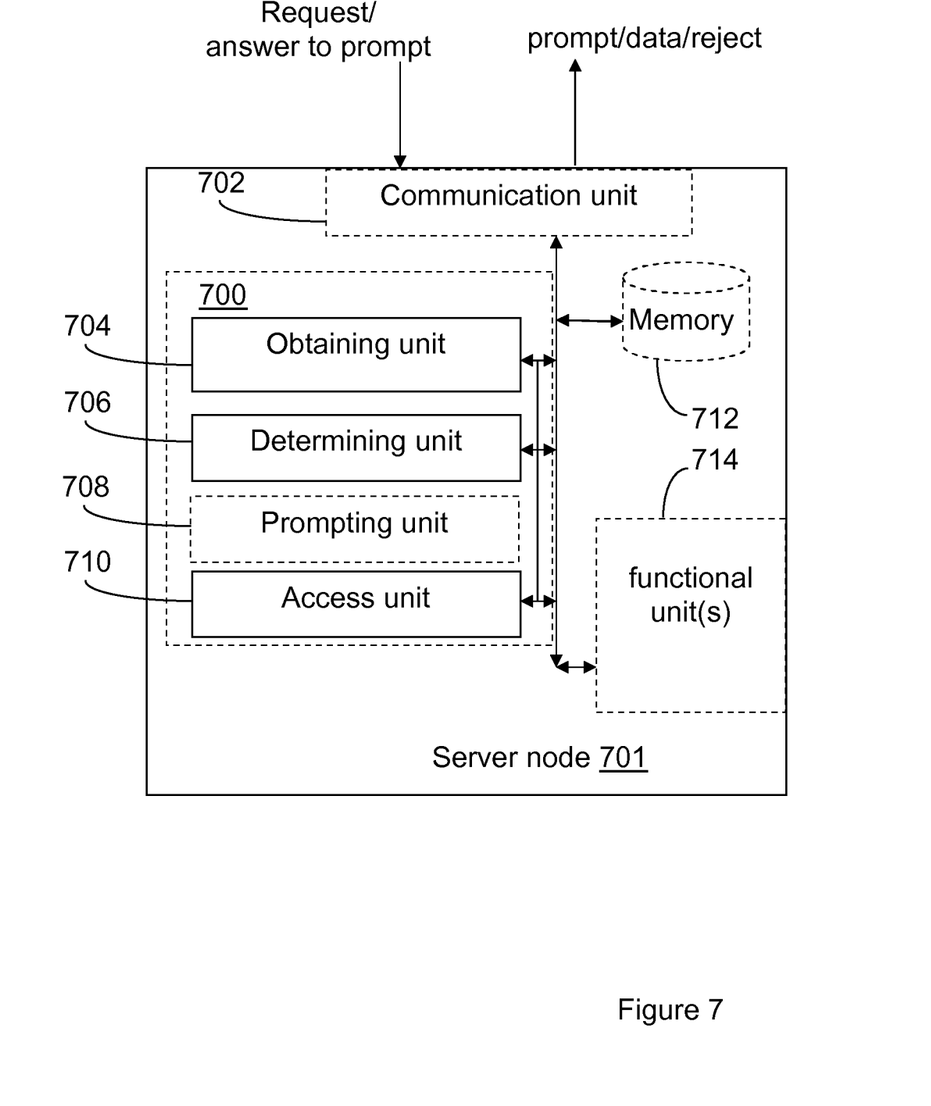
FIG. 7 is a block diagram illustrating an arrangement adapted to support secure resource sharing, according to an exemplifying embodiment.

Exemplifying Arrangement, FIG. 7

Below, an example arrangement 700, adapted to enable the performance of the above described procedure of supporting secure handling of information related to a user employing a first and a second web application, will be described with reference to FIG. 7. The information is assumed to be stored by the server node and to comprise certain data. The arrangement is illustrated as being located in a server node, 701, which is a web server. The user may be assumed to be authenticated with the server node when attempts to use cross Origin resource sharing are made. The arrangement 700 is further illustrated to communicate with other entities via a communication unit 702, which may be considered to comprise conventional means for any type of wired and/or wireless communication.

The arrangement 700 comprises an obtaining unit 704, which is adapted to receive a request, from the first web application, for access to certain data which is stored by the server node. The arrangement 700 further comprises a determining unit 706, which is adapted to determine the Origin of the first web application, and further adapted to determine the Origin of the (second) web application owning the certain data, which the first web application requests to access. The determining unit 706 is further adapted to determine, when the Origin of the first web application is different from the Origin of the second web application, whether the first web application is permitted to access the certain data or not.

Depending of which method of the different methods described above in conjunction with FIG. 6 that is to be applied for determining whether the first web application is permitted to access the certain data, the arrangement 700 should be adapted to be able to perform the actions involved, e.g. determining whether a mutual trust relation is declared and/or prompting the user. An optional prompting unit 708, adapted to prompt the user in accordance with what is described above, is illustrated having a dashed outline.

The arrangement 700 further comprises an access unit 710, which is adapted to allow or deny the first web application to access the certain data, based on whether the first web application is permitted to access the data. The arrangement 700 and/or the server node 701 may further comprise e.g. a memory 712 for storing of intermediate data.

The arrangement 700 may further be adapted to allow access to a subset of the certain data and deny access to the remaining certain data, e.g. when the first and second web applications have a mutual trust relation and/or user permission that is valid only for a part or subset of the data stored by the server node, e.g. for data stored in a certain shared folder or entity.

The server node 701 may comprise further functional units 714, e.g. for providing the regular server functionality. The functional units may be implemented in software, or in any appropriate combination of software and/or hardware. The functional units should be regarded as logical entities and not with necessity as separate physical entities.

Figure 8:
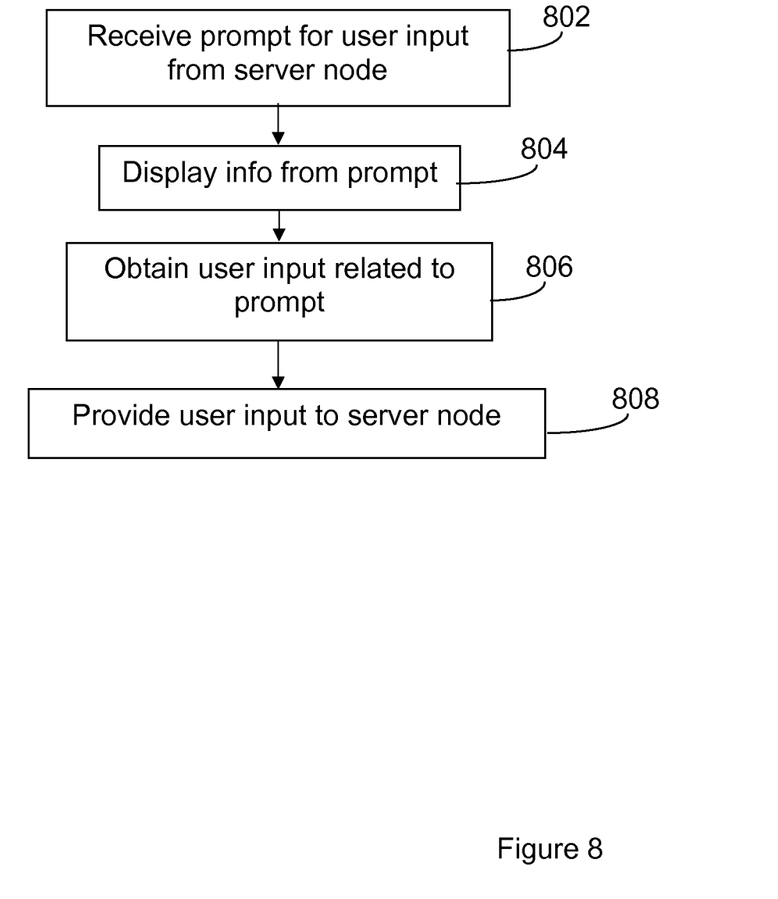
FIG. 8 is a flow chart illustrating a procedure in a browser supporting secure resource sharing, according to an exemplifying embodiment.

Exemplifying Procedure, FIG. 8.

An embodiment of a procedure in a web browser in a client node for supporting secure handling of information related to a user which is authenticated towards a server node will now be described with reference to FIG. 8. The user-related information is assumed to be stored by the server node and to comprise certain data. The user is assumed to employ a first and a second web application in the web browser supporting CORS or similar, which web applications use the server node. The client node may be e.g. a computer or a mobile terminal, such as a laptop, a tablet or a mobile phone.

Initially, a prompt is received from the server node in an action 802. The prompt comprises a request for user input, and is related to a permission for the first web application to access data owned by the second web application, which data is stored by/at the server node. Information comprised in the prompt is displayed to the user in an action 804. For example, a message reading "Do you consent to that application B accesses data belonging to application A", requesting a "yes or no"-answer, may be displayed to the user.

The prompt may further comprise information on a declared relation between the applications, which could be displayed to the user, to help her or him to decide whether the data access should be allowed. Then user input in response to the prompt is obtained in an action 806. The user input could e.g. involve the user pressing a button representing "yes" or "no", or similar. If the user refrains from or neglects to respond to the prompt, e.g. within a certain time period, this could be interpreted as that the user does not consent to the data access. The obtained user input is then provided to the server node in an action 808, thus enabling the server node to handle the request for data access in accordance with the user input.

Figure 9:
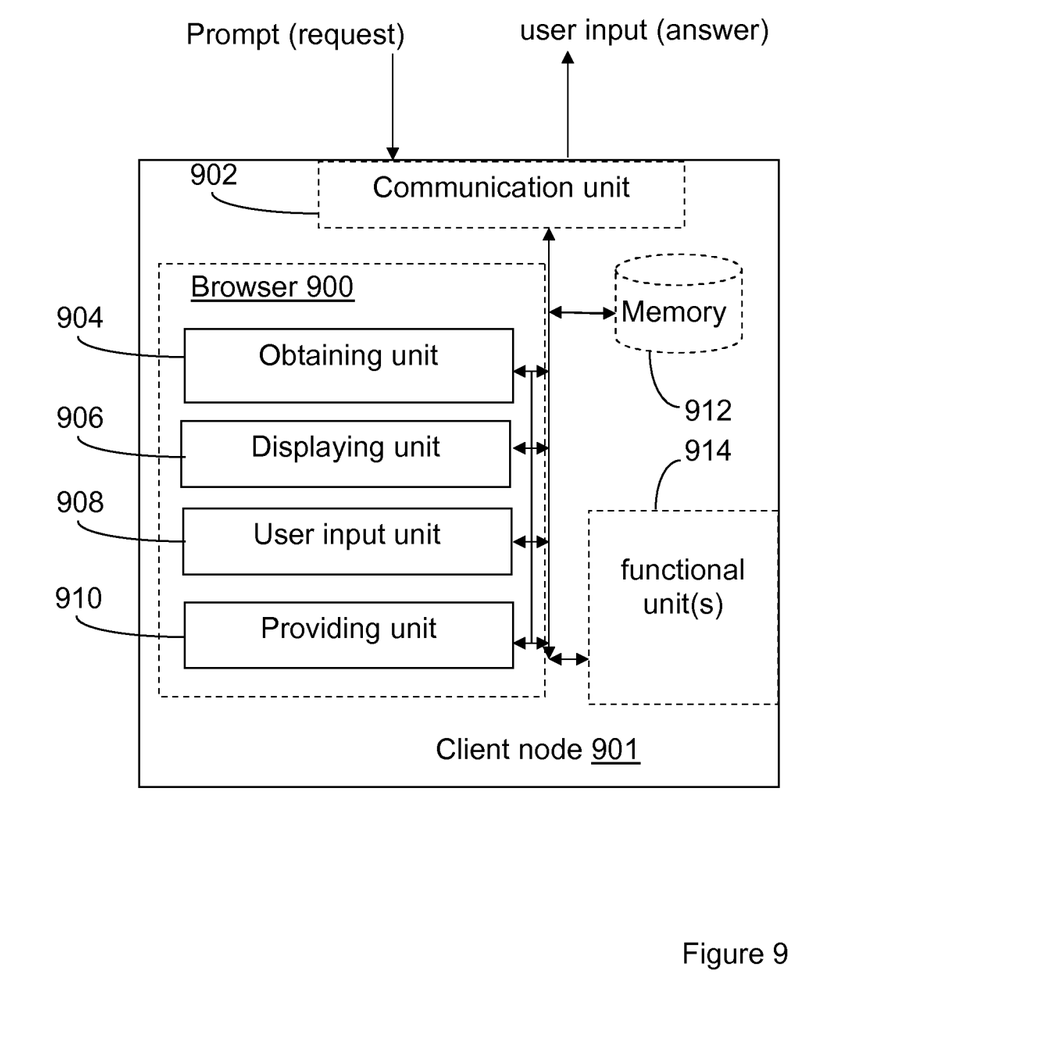
FIG. 9 is a block diagram illustrating a browser adapted to support secure resource sharing, according to an exemplifying embodiment.

Exemplifying Arrangement, FIG. 9

Below, an example web browser 900 supporting CORS or similar, adapted to enable the performance of the above, in conjunction with FIG. 8, described procedure of supporting secure handling of information related to a server node and a user employing a first and a second web application in the web browser, will be described with reference to FIG. 9. The web browser 900 is illustrated as being located in a client node, 901, which could be e.g. a computer or a mobile terminal, such as a laptop, a tablet PC or a mobile phone, as previously mentioned. The user-related information is assumed to be stored by the server node and to comprise certain data. The user is assumed to be authenticated with the server node in question when attempts to use cross Origin resource sharing are made. The web browser 900 is further illustrated to communicate with other entities via a communication unit 902, which may be considered to comprise conventional means for any type of wired and/or wireless communication.

The web browser 900 comprises an obtaining unit 904, which is adapted to receive a prompt from the server node, said prompt comprising a request for user input and being related to a permission for the first web application to access the data owned by the second web application. The web browser 900 further comprises a displaying unit 906, which is adapted to display information comprised in the prompt to the user. For example, a message, such as the one described above in conjunction with FIG. 8, could be displayed to the user, indicating that user input is expected.

Further, the web browser 900 comprises a user input unit 908, which is adapted to receive user input related to the prompt and a providing unit 910, which is adapted to provide said user input to the server node, thus enabling the server node to handle the request for data access appropriately.

The web browser 900 and/or the client node 901 may further comprise e.g. a memory 912 for storing of intermediate data. The client node 901 may comprise further functional units 914, e.g. for providing the regular client node functionality. The functional units may be implemented in software, or in any appropriate combination of software and/or hardware. The functional units should be regarded as logical entities and not with necessity as separate physical entities.

Figure 10:
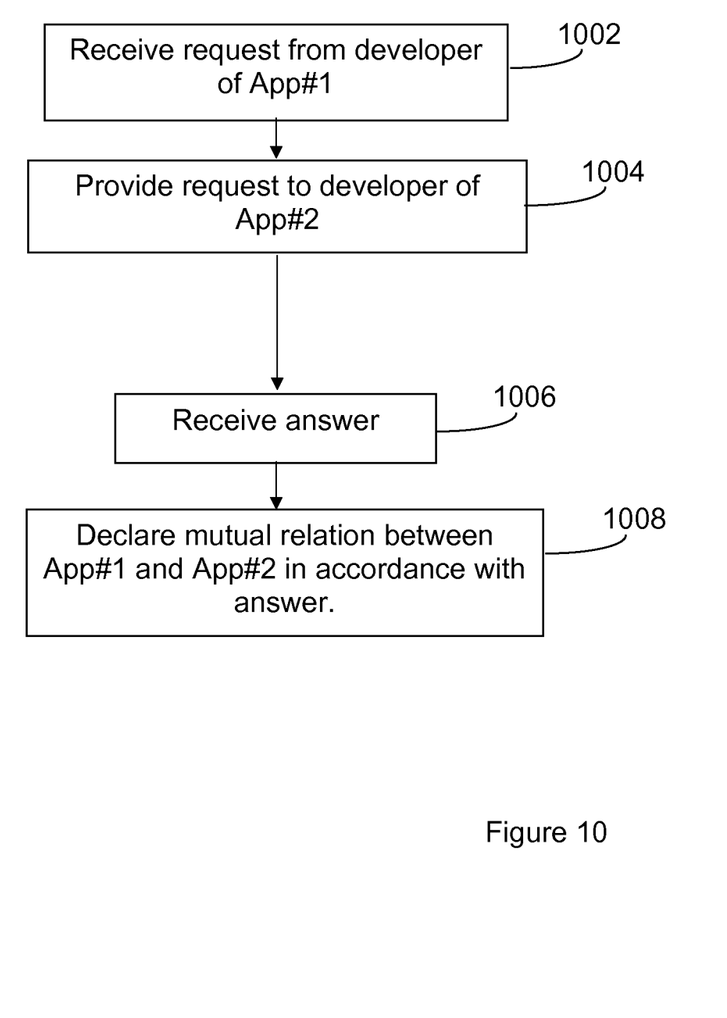
FIG. 10 is a flow chart illustrating a procedure in a server node for supporting secure resource sharing, according to an exemplifying embodiment.

Exemplifying Procedure in Server Node, FIG. 10

An embodiment of a procedure in a server node for supporting the establishing and declaring of a mutual trust relation between a first and a second web application (employed in a browser supporting CORS or similar) registered at the server node will now be described with reference to FIG. 10.

Initially, a request or proposal from a developer of the first web application is received in an action 1002, where the request relates to the establishing of a mutual trust relation between the first web application and the second web application. The request is then provided to a developer of the second web application in an action 1004. Since both the second and first web application need to be registered with the server node in order to use it the server node will be able to provide the request to the developer of the second web application, e.g. via a message in a management console, an email, or similar.

Further, an answer to the request is received from the developer of the second web application in an action 1006. For example, when the developer of the second web application provides a positive answer to the request, the first and second web applications are declared to have a mutual trust relation. Correspondingly, when the developer of the second web application provides a negative answer to the request, the first and second web applications are declared not to have a mutual trust relation. If no answer to the request is provided by the developer of the second web application within e.g. a predefined time period, this may be interpreted as a negative answer. The mutual relation between the web applications is then declared in an action 1008, in accordance with the received answer. Further, the mutual relation may be valid only for a subset of the data stored by the server node, e.g. for data in a certain folder, e.g. a folder denoted "shared data" or similar.

Figure 11:
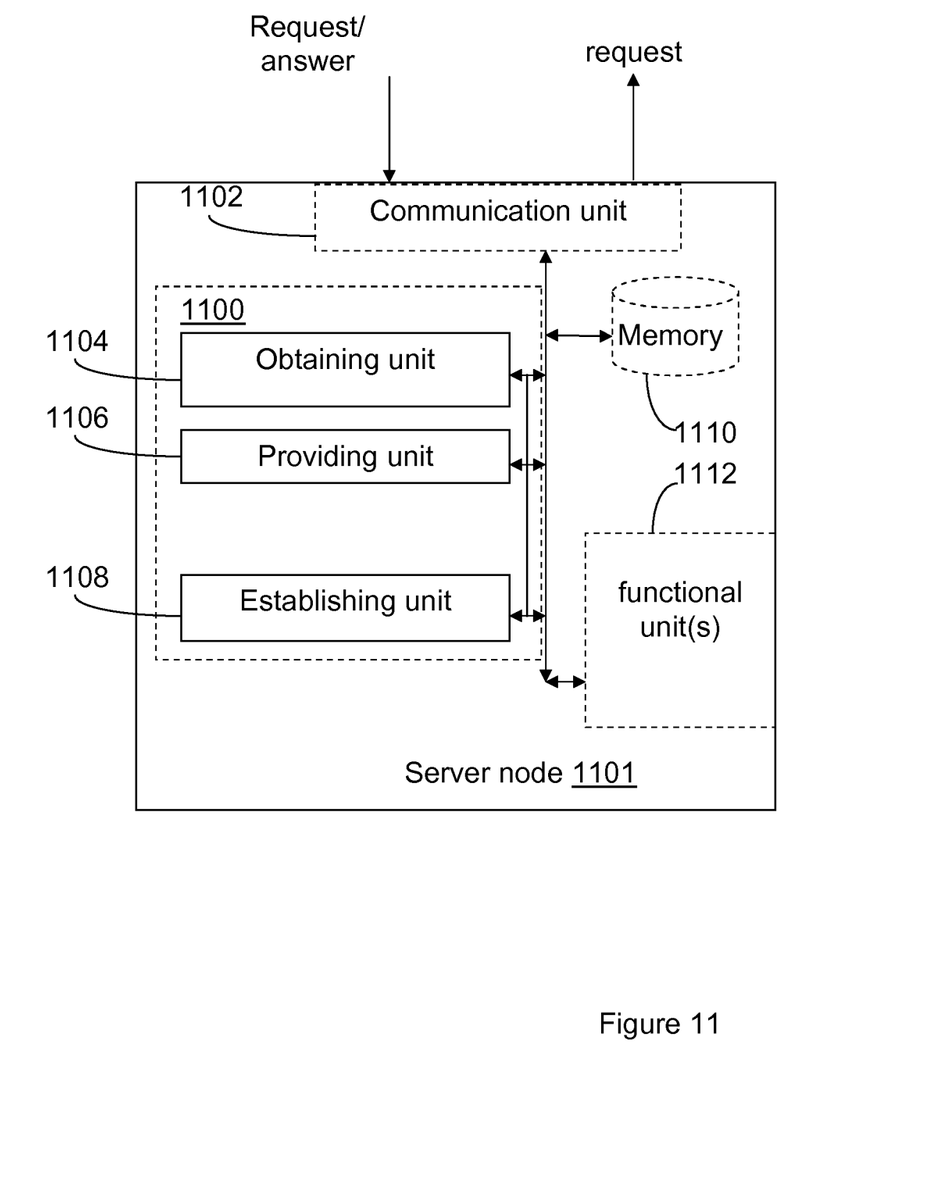
FIG. 11 is a block diagram illustrating an arrangement adapted to support secure resource sharing, according to an exemplifying embodiment.

Exemplifying Arrangement in Server Node, FIG. 11

Below, an example arrangement 1100 in a server node 1101, which arrangement is adapted to enable the performance of the above described procedure of supporting the establishing and declaring of a mutual trust relation between a first and a second web application (employed in a browser supporting CORS or similar) registered at the server node, will be described with reference to FIG. 11. The server node could be the same server node as the one illustrated in FIG. 7. The arrangement 1100 is further illustrated to communicate with other entities via a communication unit 1102, which may be considered to comprise conventional means for any type of wired and/or wireless communication.

The arrangement 1100 comprises an obtaining unit, which is adapted to receive a request or proposal from a developer of the first web application to establish a mutual trust relation between the first web application and the second web application. The arrangement 1100 further comprises a providing node, which is adapted to provide said request to a developer of the second web application. The arrangement, e.g. the obtaining unit, is further adapted to receive, from the developer of the second web application, an answer to the request, e.g. a "yes" or a "no". The absence of an answer may be interpreted as a negative answer, e.g. "No, I do not approve to the suggested mutual trust relation between the first and second web application".

The arrangement 1100 further comprises an establishing unit, which is adapted to declare a mutual relation between the first and the second web application in accordance with the received answer. The declaring could involve, e.g., the storing of an indicator of the mutual relation in a memory, such as the memory unit 1110, which may be regarded as being a part of the arrangement 1100 or as a part of the server node 1101. The mutual relation could be valid for only a part or subset of the data stored by/at the server node, such as e.g. the data stored in a certain folder or entity.

The server node 1101 may comprise further functional unit 1112, such as the functional unit 704-708, described in conjunction with FIG. 7, and/or e.g. functional unit providing regular server functionality.

The functional unit may be implemented in software, or in any appropriate combination of software and/or hardware. The functional unit should be regarded as logical entities and not with necessity as separate physical entities.

The functional modules 704-710, 904-910 and 1104-1108 described above can be implemented as program modules of a computer program comprising code means which when run by a processor in the respective server node 701, 1101 or client node 901 causes the arrangement/server node or browser/client node to perform the above-described functions and actions. The processor may be a single CPU (Central processing unit), but could also comprise two or more processing unit in the respective nodes 701, 901 and 1101. For example, the processor may include general purpose microprocessors, instruction set processors and/or related chips sets and/or special purpose microprocessors such as e.g. ASICs (Application Specific Integrated Circuit). The processor may also comprise e.g. board memory for caching purposes.

Figure 12:
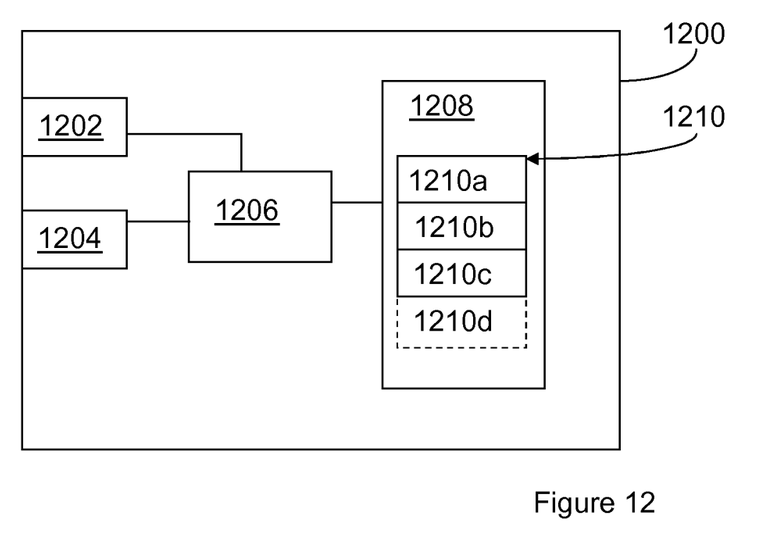
FIG. 12 is a schematic view illustrating an arrangement in a server node, according to an embodiment.

FIG. 12 illustrates an arrangement or server or client node 1200 where a computer program 1210 is carried by a computer program product 1208, connected to a processor 1206. The computer program product 1208 comprises a computer readable medium on which the computer program 1210 is stored. For example, the computer program product may be a flash memory, a RAM (Random-access memory) ROM (Read-Only Memory) or an EEPROM (Electrically Erasable Programmable ROM), and the computer program modules 1210a-d could in alternative embodiments be distributed on different computer program product in the form of memories within the arrangement or node 1200. The units 1202 and 1204 connected to the processor represent communication unit e.g. input and output.

It is to be understood that the choice of interacting unit or modules, as well as the naming of the units are only for exemplifying purpose.

ABBREVIATIONS

CORS Cross-Origin Resource Sharing
OAuth Open Authorization
XSRF Cross-Site Request Forgery

REFERENCES

[1] Cross-Origin Resource Sharing, Editor's Draft 23 Sep. 2010, http://dev.w3.org/2006/waf/access-control/
[2] The Web Origin Concept, http://tools.ietf.org/html/draft-abarth-origin-09

The invention claimed is:

1. A server node for supporting secure handling of information related to a user, said information being stored by the server node and comprising certain data, said user being authenticated towards the server node and employing a first and a second web application in a web browser supporting cross-Origin resource sharing, said method comprising:
   receiving a request, for access to the certain data being owned by the second web application and stored on the server node, from the first web application, determining the Origin of the first web application, determining the Origin of the second web application owning the certain data, which the first application requests to access, and, when the Origin of the first web application is different from the Origin of the second web application:
   determining whether the first web application fulfills a criterion, and thus is permitted to access the certain data, and allowing or denying the first web application to access the certain data, based on whether the first web application fulfills the criterion, thus enabling control of the access to stored data on the server node between web applications of different Origins used in the same web browser, when such access is enabled by cross-Origin resource sharing, wherein the determining of whether the first web application fulfills a criterion includes determining whether the first and second web applications are associated with an indicator of a mutual trust relation between the first and the second web application.

2. The method of claim 1, wherein the determining of whether the first web application fulfills a criterion includes prompting the user with a request for permission to give the first web application access to the certain data owned by the second web application.

3. The method of claim 2, wherein the user is prompted only when the first and second web application are determined not to be associated with an indicator of a mutual trust relation.

4. The method of claim 1, wherein, when the first web application is determined to fulfill the criterion only for a subset of the certain data, the first web application is allowed access to said subset of the certain data and is denied access to the remaining certain data.

5. A server node for supporting secure handling of information related to a user comprising:

memory, certain data, a first and a second web application in a web browser supporting cross-Origin resource sharing, said server node further comprising:

an obtaining unit, adapted to receive a request, for access to the certain data being owned by the second web application and stored by the server node, from the first web application, a determining unit, adapted to determine the Origin of the first web application, and further adapted to determine the Origin of the second web application owning the certain data, which the first web application requests to access, and further adapted to determine, when the Origin of the first web application is different from the Origin of the second web application, whether the first web application fulfills a criterion, and thus is permitted to access the certain data, and an access unit, adapted to allow or deny the first web application to access the certain data, based on whether the first web application fulfills the criterions thus enabling control of the access to stored data on the server node between web applications of different Origins used in the same web browser, when such access is enabled by cross-Origin resource sharing, wherein said obtaining unit, determining unit, and access unit are implemented as one or more processor circuits executing computer program instructions, and wherein the one or more processor circuits are further adapted to determine whether the first and second web applications are associated with an indicator of a mutual trust relation between the first and the second web application.

6. The server node of claim 5, further comprising a prompting unit, implemented by one or more of the processor circuits and adapted to prompt the user with a request for a permission to give the first web application access to the certain data owned by the second web application, in order to determine whether the first web application fulfills the criterion.

7. The server node of claim 5, wherein the one or more processor circuits are further adapted to, when the first web application is determined to fulfil the criterion only for a subset of the certain data, allow access to said subset of the certain data and deny access to the remaining certain data.

8. A method in a web browser in a client node for providing user input to a server node, said browser supporting cross-Origin resource sharing and said browser comprising a first and a second web application, having different Origins, being employed by a user which is authenticated towards a server node, where the first web application has requested to access user related data owned by the second web application at the server node, said method comprising:

receiving a prompt from the server node, said prompt comprising a request for user input and being related to a permission for the first web application to access the data owned by the second web application and stored on the server node, determining whether the first and second web applications are associated with an indicator of a mutual trust relation between the first and the second web application, displaying information comprised in the prompt, receiving user input as answer to the request and providing said user input to the server node thus enabling control of the access to stored data on the server node between web applications of different Origins used in the same web browser, when such access is enabled by cross-Origin resource sharing.

9. A web browser, in a client node, for providing user input to a server node, said web browser supporting cross-Origin resource sharing and comprising:

an obtaining unit, adapted to receive a prompt from the server node, to which server node a user is authenticated, said user employing, in the browser, a first and a second web application of different Origins, said prompt comprising a request for user input and information related to a permission for the first web application to access data stored on the server node, which the data is owned by the second web application, a displaying unit, adapted to display information comprised in the prompt, a memory unit, adapted to store the information, a user input unit, adapted to receive user input related to the prompt, and a providing unit, adapted to provide said user input to the server node, thus enabling control of the access to stored data on the server node between web applications of different Origins used in the same web browser, when such access is enabled by cross-Origin resource sharing, wherein said obtaining unit, displaying unit, user input unit, and providing unit are implemented as one or more processor circuits executing computer program instructions, wherein the one or more processor circuits are further adapted to determine whether the first and second web applications are associated with an indicator of a mutual trust relation between the first and the second web application.

* * * * *